United States Patent
Hara et al.

(10) Patent No.: US 6,382,012 B2
(45) Date of Patent: *May 7, 2002

(54) METHOD FOR CALIBRATING FORCE SENSOR MOUNTED ON ROBOT, AND ROBOT

(75) Inventors: Ryuichi Hara, Fujiyoshida; Kazunori Ban, Yamanashi, both of (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/253,719

(22) Filed: Feb. 22, 1999

(30) Foreign Application Priority Data

Feb. 23, 1998 (JP) .......................... 10-055743

(51) Int. Cl.[7] ............................... G01L 25/00
(52) U.S. Cl. ..................................... 73/1.15
(58) Field of Search ................. 73/1.15, 1.08–1.13

(56) References Cited

U.S. PATENT DOCUMENTS

| | | | |
|---|---|---|---|
| 4,620,436 A | * 11/1986 | Hirabayashi et al. | 73/1.15 |
| 5,092,154 A | * 3/1992 | Eldridge et al. | 73/1.15 |
| 5,230,672 A | * 7/1993 | Brown et al. | 73/1.15 |
| 5,261,266 A | * 11/1993 | Lorenz et al. | 73/1.15 |

FOREIGN PATENT DOCUMENTS

| | | | |
|---|---|---|---|
| EP | 0 361 663 A2 | 4/1990 | |
| JP | 62-237335 | 10/1987 | |
| JP | 3-55189 | 3/1991 | |
| JP | 42029 | * 2/1992 | 73/1.15 |
| JP | 7-19982 | 1/1995 | |
| JP | 7-77476 | 3/1995 | |

* cited by examiner

Primary Examiner—Hezron Williams
Assistant Examiner—Nashmiya Fayyaz
(74) Attorney, Agent, or Firm—Staas & Halsey LLP

(57) ABSTRACT

A method for executing calibration without having to dismount a force sensor from a robot, and an apparatus for executing this method are provided. When a robot mounted with a calibrated force sensor begins to be operated, any tool whose position of the center of gravity and weight are immune from change is fitted, and a command for acquiring reference data is given to execute operational programs. Reference data V0 of matrices consisting of differences between strain gage outputs (S1, S2) of the force sensor in any predetermined posture and strain gage outputs in other predetermined postures differing both from that posture and from one another are calculated and stored (S3-1 to S7). When the measuring accuracy of the force sensor drops, the tool used when the reference data were acquired is mounted on the robot, and the same procedures S1 to S6 are executed, and the data V'0 corresponding to the reference data are calculated. From the data V'0 and the reference data V0 is calculated a parameter M for updating the calibration matrices.

15 Claims, 4 Drawing Sheets

| TYPE OF PARAMETER | C | vb | V0 | Vb' | V'0 | M |
|---|---|---|---|---|---|---|
| NUMBER OF PARAMETERS | 6 × 8 | 8 × 1 | 8 × n | 8 × 1 | 8 × n | 8 × 8 |
| CALIBRATION AT SHIPMENT TIME | NEW | — | — | — | — | $M \leftarrow I$ |
| ACQUISITION OF REFERENCE DATA | — | UPDATE | UPDATE | — | — | — |
| RE-CALIBRATION | — | — | — | UPDATE | UPDATE | $M \leftarrow V0 \ V'0^T \ (V'0 V'0^T)^{-1}$ |

METHOD FOR CALIBRATING FORCE SENSOR MOUNTED ON ROBOT, AND ROBOT

BACKGROUND OF THE INVENTION

1. Field of the Invention

The present invention relates to the calibration of a force sensor mounted on an industrial robot.

2. Description of the Related Art

The calibration of a force sensor mounted on an industrial robot is conducted as a part of the manufacturing process after the force sensor is assembled. This precisely calibrated force sensor is mounted on the tip area of a band, such as a wrist flange, of a robot, and the robot is shipped from a factory in a form mounted with the force sensor.

Here, a conventional calibration of the force sensor is described with reference to FIG. 5.

A calibration stand 60 comprises a base 64, a firm 62 stood on the base 64, and a beam 66 one end of which is fixed to the upper end of the fulcrum 62. A force sensor 40 is mounted on an upper face 66a of the beam 66, and a calibration jig 68 is mounted on the force sensor 40. Further, a weight 70 is hung on the calibration jig 68 via a hanger 72.

The calibration of the force sensor 40 is operated by varying the magnitude of force and the moment applied to it by varying the posture of the force sensor 40 in which it is fitted to the calibration stand 60 and the total weight of the weight 70 in many ways.

The principle of the calibration will be described below with reference to the force sensor, which detects six axial forces comprising translational forces Fx, Fy and Fz in mutually orthogonal directions of Y and Z axes and axial moments Mx, My and Mz about these axes.

This force sensor for detecting the six axial forces has eight strain gages attached to the mechanistic section of the force sensor as a force detecting section, and these eight strain gages output voltages as detection signals from the force detecting section correspondingly to loads working on the force sensor.

The voltage output from the strain gages is denoted by v1, v2, ... v8 and the output of the force sensor is denoted by the translational forces Fx, Fy and Fz together with the axial moments Mx, My and Mz as described above, and, further, a calibration matrix of conversion parameters for obtaining the power for force detection to be calculated from output signals from the force detecting section is denoted by C, and then the relationship among them is represented by equation 1.

$$\begin{bmatrix} C11 & C12 & \cdots & C18 \\ C21 & C22 & \cdots & C28 \\ \vdots & \vdots & & \vdots \\ C61 & C62 & \cdots & C68 \end{bmatrix} \begin{bmatrix} v1 \\ v2 \\ \vdots \\ v8 \end{bmatrix} = \begin{bmatrix} Fx \\ Fy \\ Fz \\ Mx \\ My \\ Mz \end{bmatrix} \quad (1)$$

When a known force Fx is applied to the force sensor 40, the relationship of equation 2 below is established using an unknown calibration matrix C.

$$Fx = \begin{bmatrix} c11 & c12 & \cdots & c18 \end{bmatrix} \begin{bmatrix} v1 \\ v2 \\ \vdots \\ v8 \end{bmatrix} \quad (2)$$

If this force Fx is varied in many ways and added m times (i.e. forces Fx1, Fx2 ... Fxm are added) and the output of the strain gages (v11–v1m, ..., v81–v8m) is measured each time, the relationship of equation 3 below will hold.

$$\begin{bmatrix} Fx1 & Fx2 & \cdots & Fxm \end{bmatrix} = \begin{bmatrix} c11 & c12 & \cdots & c18 \end{bmatrix} \begin{bmatrix} v11 & v12 & \cdots & v1m \\ \vdots & \vdots & & \vdots \\ v81 & v82 & \cdots & v8m \end{bmatrix} \quad (3)$$

Equation 3 above can be rewritten into the following equation 3'.

$$FX^T = c1^T V \quad (3')$$

Incidentally, in the above-mentioned equation 3', matrices Fx, and c1 are:

$$Fx = [Fx1\ Fx2\ \ldots\ FxM]^T$$

$$c1 = [c11\ c12\ \ldots\ c18]^T$$

And matrix V is represented by the following equation 4.

$$V = \begin{bmatrix} v11 & v12 & \cdots & v1m \\ v21 & v22 & \cdots & v2m \\ \vdots & \vdots & & \vdots \\ v81 & v82 & \cdots & v8m \end{bmatrix} \quad (4)$$

The minimum approximate square solution of matrix c1 is determined by equation 6 as the c1 that minimizes the value of the following equation 5.

$$E^2 = (Fx^T - c1^T V)^T(-c1^T V) \quad (5)$$

$$c1^T = FX^T V^T (VV^T)^{-1} \quad (6)$$

In the above-described equation 6, $V^T(VV^T)^{-1}$ is a pseudo inverse matrix of a matrix V. Similarly, when the forces of the other elements than force Ex are applied at the same time and the output of the force sensor is recorded, the relationship of the equation 7 below is obtained.

$$\begin{bmatrix} Fx1 & Fx2 & \cdots & Fxm \\ Fy1 & Fy2 & \cdots & Fym \\ \vdots & \vdots & & \vdots \\ Mz1 & Mz2 & \cdots & Mzm \end{bmatrix} = \quad (7)$$

$$\begin{bmatrix} C11 & C12 & \cdots & C18 \\ C21 & C22 & \cdots & C28 \\ \vdots & \vdots & & \vdots \\ C61 & C62 & \cdots & C68 \end{bmatrix} \begin{bmatrix} v11 & v12 & \cdots & v1m \\ v21 & v22 & \cdots & v2m \\ \vdots & \vdots & & \vdots \\ v81 & v82 & \cdots & v6m \end{bmatrix}$$

or $$F = CV \quad (7')$$

Incidentally, in equation 7', F is a matrix represented by the following equation 8, comprising the output of the force sensor measured m times.

$$\begin{bmatrix} Fx1 & Fx2 & \cdots & Fxm \\ Fy1 & Fy2 & \cdots & Fym \\ \vdots & \vdots & & \vdots \\ Fz1 & Fz2 & \cdots & Fzm \end{bmatrix} \quad (8)$$

Calibration matrix C given by the above-stated equation 7 or 7' is to be found out by the following equation 9.

$$C = FV^T (VV^T)^{-1} \quad (9)$$

In order to obtain the pseudo inverse matrix of matrix V, it is necessary and sufficient to apply to the force sensor such forces and moments as will give eight sets or more of linear independent strain gage outputs.

Calibration matrix C obtained in this way is stored and, when the robot is operated and forces are detected by the force sensor, the output from the strain gages of the force sensor (v1, v2 ... v8) and this calibration matrix C are put into arithmetic operation of equation 1 to determine the translational forces Fx, Fy and Fz, and the moments Mx, My and Mz.

On the other hand, if an excessive load is applied to the force sensor and plastic deformation or the like occurs, the measuring accuracy will decrease, and according to the prior art it is necessary to dismount the force sensor from the robot temporarily and perform the above-described calibration again with the stand 60, calibration jig 68 and other members described above to find out a new calibration matrix C and store it. This not only entails much trouble but also may entail a slight mounting shift in the dismounting/remounting procedure because the force sensor fitted to a tip of the robot is dismounted and remounted. In particular, where the offset between the robot face plate and the tip of the tool is great, the shift of the tool center point (TCP) may often be too significant to ignore, necessitating fine adjustment in the teaching of the robot.

OBJECTS AND SUMMARY OF THE INVENTION

It is the object of the present invention to provide a force sensor permitting ready re-calibration while remaining mounted on the tip of the hand of the robot, so that, even if an accident such as a clash occurs to the force sensor while in use mounted on the robot, and the force sensor is overloaded as a result, with its mechanistic section plastic-deformed and measuring accuracy deteriorated, it can be subjected to simplified calibration entailing only minimal man-hours without requiring replacement.

To attain this object, according to the present invention, reference data for carrying out simplified calibration needing no dismounting of the force sensor from the robot are acquired and stored beforehand, and when re-calibration is needed because of a drop in measuring accuracy by any reason, the simplified calibration can be operated by utilizing the reference data.

The present invention makes it possible to carry out the re-calibration of the force sensor by utilizing tools for conventional use or other members without having to dismount the force sensor from the robot and without utilizing a weight or the like, whose weight and position of the center of gravity are precisely known, so that the force sensor can be easily restored to its normal state in a short period of time.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
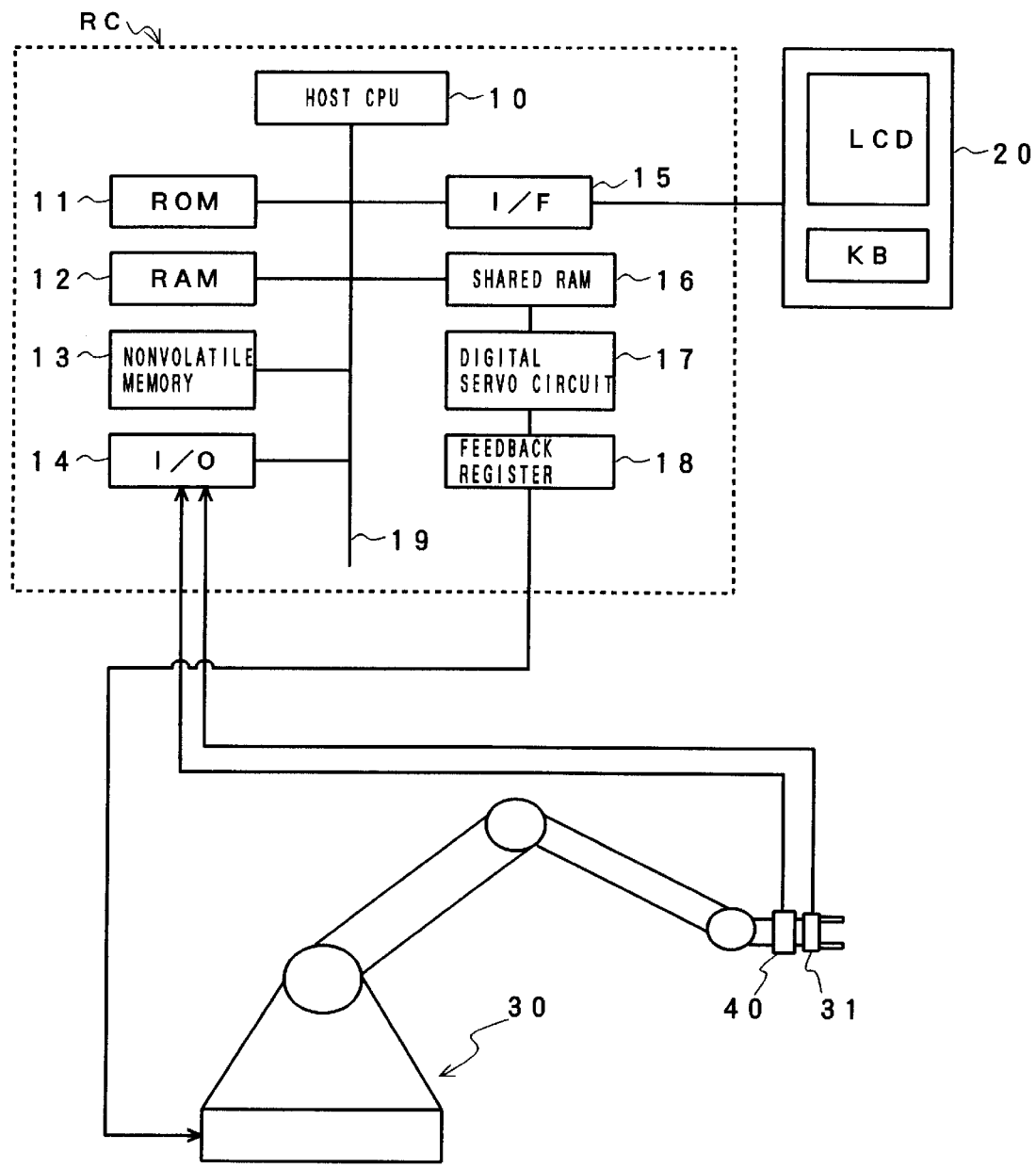
FIG. 1 is a block diagram of a robot for parrying out calibration according to the present invention and of a robot controller for controlling the robot.

First, a method for acquiring reference data and the operating principle of simplified calibration according to the present invention will be described. The following description will refer to, as an example, a force sensor which, when mounted on a robot, has eight strain gages as a force detecting section, capable of detecting six axial forces comprising translational forces in the orthogonal directions of X, Y and Z axes and the axial moment about these axes.

<Acquisition of Reference Data>

When a force sensor mounted on a robot is functioning normally after the robot fitted with the force sensor that has been already calibrated is shipped from its factory and installed, reference data is acquired by choosing a tool or some other member that the users of the robot employ routinely, whose weight and position of the center of gravity are immune from change by aging (it doesn't matter even if the weight and the position of the center of the gravity are unclear), as the calibrating tool and mounting this tool on the wrist of the robot, and varying the posture of the robot in many ways by executing a prescribed operational program to change the posture of the force sensor.

First, the robot is positioned in an arbitrary posture for obtaining a bias output predetermined by the prescribed operational program mentioned above, and the voltages outputted at this time from the eight strain gages which constitute the force detecting section of the force sensor are detected, and a bias output matrix vb is stored as $$vb = [vb1 \ vb2 \ldots vb8]^T$$

where vb1, vb2 ... vb8 denote output voltages from the eight strain gages.

Further, in accordance with the prescribed operational program described above, the robot is moved to n postural positions that differ both from the aforesaid posture for obtaining the bias output and from one another, and a force and a moment that may give n sets of linear independent strain gage outputs are applied to the force sensor. This number n is either equal to or greater than the number of strain gages (therefore, in the case of a six-axial force sensor provided with eight strain gages, $n \geq 8$).

In these postural position, the outputs of the strain gages (va11, va12 ... va18; va21, va22 ... va28; ...; van1, van2 ..., van8) are detected, and a matrix (va1, va2 ... van) is obtained from the detected outputs. Subsequently, according to this matrix, reference data V0 representing the variation rate of signals from the force detecting section caused by the variations in the posture of the force sensor are acquired by the following equation 10 and stored.

$$V0 = [va1\ va2\ \cdots\ van] - [vb\ vb\ \cdots\ vb] = \qquad (10)$$

$$\begin{bmatrix} va11 & va21 & \cdots & van1 \\ va12 & va22 & \cdots & van2 \\ \vdots & \vdots & & \vdots \\ va18 & va28 & \cdots & van8 \end{bmatrix} - \begin{bmatrix} vb1 & vb1 & \cdots & vb1 \\ vb2 & vb2 & \cdots & vb2 \\ \vdots & \vdots & & \vdots \\ vb8 & vb8 & \cdots & vb8 \end{bmatrix}$$

Further, reference force moment data F0 as the reference data that express the force moment are represented by equation 11 below.

$$F0 = CV0 \qquad (11)$$

<Operation of Simplified Calibration>

When re-calibration is needed because the force sensor is overloaded by accident while the robot is being used, and the measuring accuracy drops, simplified calibration according to the present invention is executed without having to dismount the force sensor from the robot.

This simplified calibration utilizes the above-mentioned calibrating tool and the operational program, which are used when the reference data V0 are to be acquired. Thus, the calibrating tool is mounted on the wrist of the robot, and the robot is caused to execute the operational program described above, and, bias output matrix vb of the strain gages and output matrix of the strain gages in each posture [v'ad, v'a2 . . . V'an] are obtained under the same conditions as those for the acquisition of the reference data, and data V'0 corresponding to reference data V0 are acquired by arithmetic operation of the following equation 12.

$$V'0 = [v'a1\ v'a2\ \cdots\ v'an] - [v'b\ v'b\ \cdots\ v'b] = \qquad (12)$$

$$\begin{bmatrix} v'a11 & v'a21 & \cdots & v'an1 \\ v'a12 & v'a22 & \cdots & v'an2 \\ \vdots & \vdots & & \vdots \\ v'a18 & v'a28 & \cdots & v'an8 \end{bmatrix} - \begin{bmatrix} v'b1 & v'b1 & \cdots & v'b1 \\ v'b2 & v'b2 & \cdots & v'b2 \\ \vdots & \vdots & & \vdots \\ v'b8 & v'b8 & \cdots & v'b8 \end{bmatrix}$$

After that, since the product of multiplication of current data V'0 expressing the variation rate of the strain gage output signals ensuing from the posture variation of the force sensor at this point of time by calibration matrix C' to be newly calculated has to be equal to reference force moment data F0 figured out by the equation 11 above, new calibration matrix C' is to be calculated. Thus, $$C'V'0 = F0 = CV0 \qquad (13)$$

From equation 13 above is derived.

$$C' = CV0\ V'0^T(V'0\ V'0^T)^{-1} = CM \qquad (14)$$

provided that M is defined as follows:

$$M = V0\ V'0_T(V'0\ V'0^T)^{-1} \qquad (15)$$

This parameter M is calculated by the above-mentioned equation 15, and is stored. Further, when a robot on which simplified calibration has not yet been executed is to be shipped from the factory, unit matrix I is stored as this parameter M.

In the above-cited equations 13 to 15, C is the caabration matrix at the time the force sensor is mounted, shipped from the factory and installed and the reference data V0 are acquired, and comprises the data that are stored in a controller. Further, the data V0 is the reference data that are obtained by reference data acquisition and stored. Furthermore, since the data V'0 is acquired by the current execution of the operational program, new calibration matrix C' eventually is obtained by equation 14 above, and the parameter M referred to above is obtained by equation 15.

Figures 3, 4:
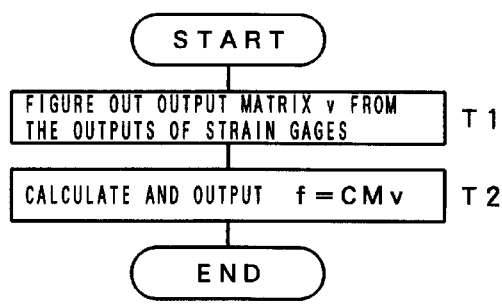
FIG. 3 is a flow chart illustrating the process in which the robot controller in FIG. 1 detects forces.
FIG. 4 is a table tracing the acquisition and transition of parameters.
Figure 5:
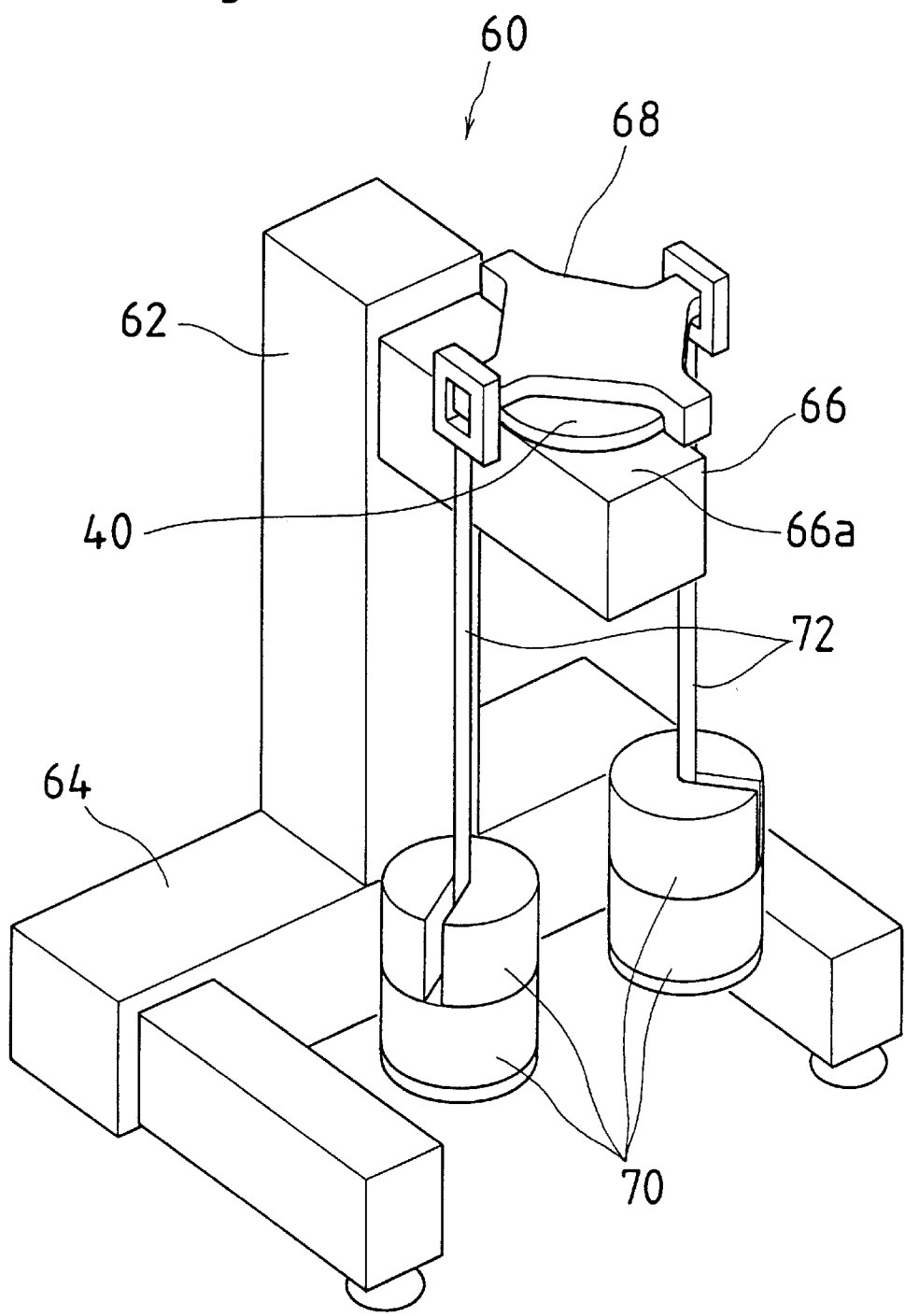
FIG. 5 illustrates a conventional apparatus for use in the calibration of force sensors.

FIG. 4 is a table summing up the acquisition of the reference data and data acquisition by the simplified calibration described above.

<Use of the Force Sensor After Simplified Calibration>

Force measurement with the force sensor after undergoing the simplified calibration described above gives three translational forces and three moments by arithmetic operation of the following equation 16. Where output matrix v consists of the outputs of the strain gages (v1, v2 . . . v8) as a force detecting section is:

$$v = [v1\ v2\ v8]^T$$

the output f of the force sensor to be calculated is:

$$f = [Fx\ Fy\ Fz\ Mx\ My\ Mz]^T$$

the output f is represented by the following equation 16.

$$f = C'v = CMv \qquad (16)$$

<Method for Confirming the Status of the Force Sensor>

Check-up of whether the measuring accuracy of the force sensor has dropped or not is accomplished by mounting the calibrating tool described above on the robot, moving the robot to the posture for obtaining the bias output matrix vb described above, measuring the voltage output from the strain gages which constitute the force detecting section of the force sensor, seeing whether or not the measured results are respectively identical with the values of the corresponding elements of the stored bias output matrix vb, and checking the shift of the zero point of the force sensor.

Additionally, since this bias output matrix vb' is renewed and stored every time the simplified calibration of FIG. 4 is executed, any drop in force sensor accuracy can be detected by comparing this bias output matrix vb' even if the simplified calibration is executed many times.

The main part of the robot for implementing the calibration method according to the present invention is illustrated by the block diagram of FIG.

A robot controller RC mainly consists of a host computer 10 for controlling the entire robot system; a ROM 11, a RAM 12, a nonvolatile memory 13, an input/output circuit 14, a unit 15 for interfacing with a teaching control panel 20, a shared RAM 16, all connected to the host computer 10 by a bus 19; and a digital servo circuit 17 and a feedback register 18, connected to the host computer via the shared RAM 16.

The ROM 11 stores a variety of system programs. The RAM 12 is a memory used for storing data temporarily, and in the nonvolatile memory 13 are stored a variety of programs such as an operation program for the robot or operation programs for a force sensor 40 and an end effector (tool) 31 as external units. Further, in the nonvolatile memory 13 is also stored reference data V0 to be described later in connection with the present invention and programs for executing the simplified calibration.

The input/output circuit 14 is connected to the force sensor 40 mounted on the wrist flange of the robot 30, and is also connected to the end effector (tool) 31 that is connected to the wrist Range via the force sensor 40. In addition, the teaching control panel 20 equipped with a liquid crystal display (LCD) and a keyboard (KB) is connected to the interface unit 15 to make it possible to teach operational programs to the robot 30 via the teaching control panel 20 and to input a variety of commands.

The shared RAM 16 delivers to the processor of the digital servo circuit 17 movement commands or control signals outputted from the host computer 10, or conversely, a variety of signals from the processor of the digital servo circuit 17 to the host computer 10.

The digital servo circuit 17, comprising a processor, a ROM and a RAM among other constituent elements, controls servo motors of each axis of the robot by performing servo control (feedback control of positions, speeds and currents) by software control according to movement commands for each axis of the robot, sent via the shared RAM 16, and the feedback values of the position, speeds and current of the servo motors for driving each axis, fed back and stored in the feedback register, to drive the robot 30.

The configuration of the robot controller or the like described above is no different from any conventional robot controller, but the present invention enables a conventional force sensor mounted on the robot 30 to undergo calibration as described above without having to dismount the force sensor 40 from the robot 30. According to the present invention, the software and the calibration matrix C of the force sensor 40 precisely calibrated when the robot 30 is shipped from the factory and the unit matrix I as parameter M referred to above are stored in the nonvolatile memory 13 in the robot controller RC, so that the calibration according to the present invention can be executed afterwards. These are features of the present invention which the prior art does not have.

When the robot 30 is installed and ready for use, acquisition of reference data is first processed.

The calibration according to the present invention executed by the host computer 10 in the robot controller RC in FIG. 1 will be explained below with reference to the flow chart of FIG. 2.

When the reference data is acquired, a tool or other member of a kind that the users of the robot employ routinely, whose weight and position of the center of gravity are immune from change by aging, is chosen as a calibration tool 31, and this calibration tool 31 is mounted on the wrist of the robot, to which a command for acquiring the reference data is given from the teaching control panel 20.

When this command is inputted, the host computer 10 first gives a movement command to move into a posture for obtaining a bias output. The digital servo circuit 17 receives the movement command via the shared RAM 16, executes feedback control of positions, speeds and currents to control the servo motor of each axis, and positions the robot 30 in a predetermined posture to obtain the bias output (Step S1). Then, the strain gage outputs of the force sensor 40, v1, v2 . . . v8, (this embodiment uses a force sensor with eight strain gages for detecting six axial forces) are calculated and stored as a bias output matrix vb (Step S2).

Next, a movement command for a first posture is outputted, and the robot 30 is positioned in the first posture (Step S3-1). Then, the strain gage outputs of the force sensor 40, v1, v2 . . . v8 obtained when the robot 30 holds the first posture are stored as an output matrix va1 in the first posture (Step S4-1).

Thereafter, the robot 30 is successively moved into predetermined second, third . . . tenth postures, and the strain gage outputs are detected when the robot 30 holds individual postures, and output matrices va2, va3 . . . va10 are calculated and stored (Steps S3-2, S4-2 to Step S3-10, S4-10). In this embodiment, n in equation 10 is 10 (n=10), differing from the value of n for the posture to obtain the bias output matrix, but intended to detect strain gage outputs while holding the mutually different postures from the first to tenth, postures that can obtain ten linear independent strain gage outputs, more than the number (8) of strain gages constituting the force detecting section of the force sensor.

Figure 2:
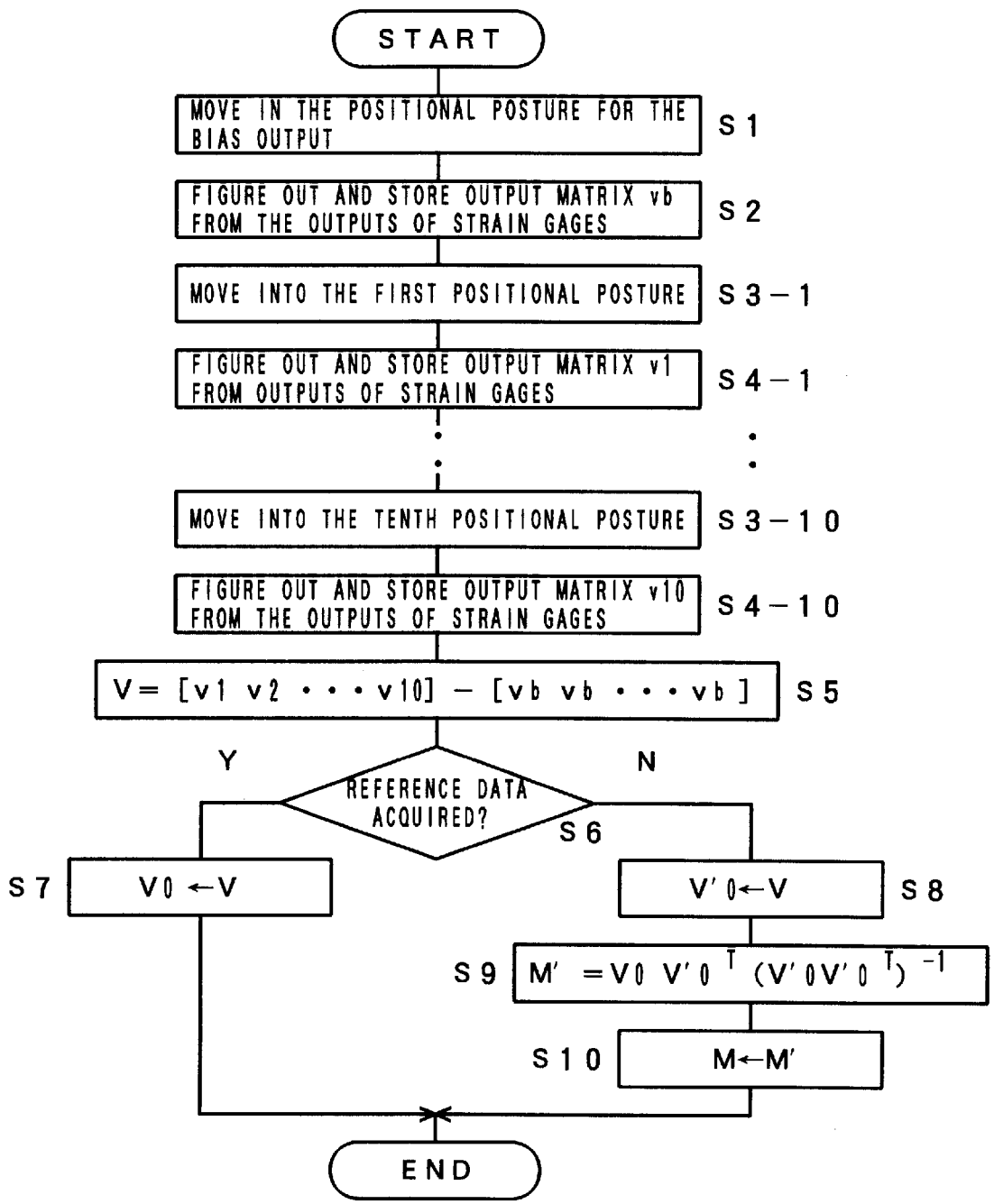
FIG. 2 is a flow chart illustrating the process in which the robot controller in FIG. 1 carries out calibration.

In FIG. 2, expression of Steps S3-2, to S3-9 and Steps S4-2 to S49 is omitted.

The output matrices va1, va2 . . . van calculated in this manner and the bias output matrix vb are put to arithmetic operation in equation 10, followed by calculation of the difference output matrix V (Step S5), and it is determined whether it is a command for acquiring the reference data or one for executing the simplified calibration (Step S6). In this case, since it is a command for acquiring the reference data, the calculated difference output matrix V is stored as reference data V0 (Step S7), and this processing for reference data acquisition is thereby finished.

In usual robot operation, when the output of the force sensor 40 is required, the host computer 10 in the robot controller RC executes force detection processing as shown in FIG. 3, and calculates six axial forces.

Thus, the strain gage outputs of the force sensor 40, v1, v2 . . . v8, are read out (Step T1); the matrix v consisting of these outputs, the stored calibration matrix C, and the parameter M consisting of the unit matrix I referred to above are put to arithmetic operation of equation 16; six axial forces Fx, Fy, Fz, Mx, My and Mz are calculated and outputted (Step T2); and the force detection processing is thereby finished.

Next, during the operation of the robot 30 fitted with the force sensor 40, when re calibration is needed as the force sensor 40 is overloaded by accident, and the measuring accuracy of the force sensor 40 drops, the calibrating tool 31 is mounted on the wrist of the robot, and a command for the simplified calibration is inputted from the teaching control panel 20.

In accordance with this command, the main processor 10 starts the processing shown in FIG. 2. The procedures from Step S1 to Step S6 are the same as those executed to acquire the reference data as described above. Since it is judged at Step S6 that a command for the simplified calibration has been inputted, process proceeds to Step 8, where the difference output matrix V obtained at Step 5 is stored as data V'0 corresponding to the reference data. Thus, data V'0 corresponding to the reference data are calculated by arithmetic operation of equation 12 by the procedures of Steps S5 and S8.

Next, the calculated data V'0 and reference data V0 together with parameter M are put to arithmetic operation of equation 15, and the obtained matrix M' is stored as a new parameter M (Steps S9 and S10) to complete the simplified calibration.

After that, in the processing shown in FIG. 3, when forces are detected by the force sensor 40, the parameter M renewed at Step S10 is used for the calculation of the six axial forces at Step T2.

What is claimed is:

1. A method of calibrating a force sensor mounted on a robot, using conversion parameters transforming an output signal generated by force or moment applied to the force sensor, comprising:

mounting a member on the end of the force sensor, varying a posture of the force sensor by moving said robot, and storing an amount of variation in output signals of the force sensor as reference data;

remounting, after the member has been dismounted, the member on the end of the force sensor, and varying the posture of the force sensor in the same way as when said reference data was acquired, and detecting the amount of variation in output signals from the force sensor as current data; and updating a parameter used for conversion of the output signals from said force sensor into force data to be detected using said reference data and said current data.

2. The method for calibrating a force sensor mounted on a robot according to claim 1, wherein said force sensor has a force detecting section responsive to n dimensions (n is an arbitrary positive integer), and acquires said reference data and said current data by varying the posture of the robot and having the force sensor acquire the amount of variation in n or more kinds of output signals from the force detecting section.

3. The method for calibrating a force sensor mounted on a robot according to claim 1, wherein the amount of variation in output signals from the force sensor are calculated as differences between output signals from the force sensor when the robot is held in any predetermined posture and output signals from the force sensor when the robot is held in another posture.

4. The method for calibrating a force sensor mounted on a robot according to claim 1, wherein said robot is a six-axis robot.

5. A robot equipped with a force sensor mounted at a tip of a wrist thereof, designed so that calibration of the force sensor can be executed to update a conversion parameter transforming an output signal generated by force or moment applied to the force sensor, comprising:

a variation amount detecting device obtaining an amount of variation in output signals from the force sensor by varying a posture of said force sensor by varying the posture of the robot in a prescribed pattern;

a reference data acquiring device detecting the amount of variation while a tool is mounted on the force sensor, when a command to acquire reference data is inputted, using said variation amount detecting device, and storing detected amount of variation in a storage device as reference data; and a detecting device designed to follow a dismounting and remounting of the tool mounted on the force sensor, when a command for simplified calibration is inputted, an amount of variation is detected using said variation amount detecting device, to obtain a detected amount of variation as current data, and updating a parameter for conversion of the output signals from said force sensor into force data to be detected with said reference data and said current data.

6. The robot, according to claim 5, wherein said force sensor has a force detecting section responsive to n dimensions, and the detecting device has the force sensor obtain an amount of variation in n or more kinds of output signals from the force detecting section by varying the posture of the robot.

7. The robot according to claim 5, wherein said detecting device obtains an amount of variation as differences between output signals from the force sensor when the robot is held in any predetermined posture and an output signal from the force sensor when the robot is held in another posture.

8. The robot according to claim 5, wherein said robot is a six-axis robot.

9. A method of calibrating a force sensor mounted on a robot comprising:

mounting a tool on the force sensor;

varying a posture of the force sensor;

issuing an acquire reference data command which stores reference data correlating to a measured variation in output signals of the force sensor;

dismounting and remounting the tool; and issuing a simplified calibration command, which stores current data correlating to a measured variation in output signals of the force sensor, and updates a conversion parameter using the current data and the reference data.

10. A robot equipped with a force sensor, comprising:

a detecting device detecting a variation in output signals from a force sensor by varying a posture of the force sensor in a prescribed pattern, the detecting device designed to follow a dismounting and remounting of a tool mounted on the force sensor;

a reference device requesting the variation in output signals from the force sensor while the tool is mounted and storing the variation in output signals as reference data; and a simplified calibration device requesting a new variation in output signals from the force sensor after the reference data is acquired and the tool is dismounted and remounted, and storing the variation in output signals as current data, and updating a calibration parameter using the reference data and the current data.

11. The robot equipped with a force sensor of claim 10, wherein the calibration parameter is a ratio of the reference data and the current data.

12. A method of calibrating a force sensor mounted on a robot, comprising:

mounting a member on the force sensor on the robot;

varying a posture of the robot having the member mounted thereon;

storing reference data indicating forces sensed by the force sensor due to the variance in posture of the robot;

dismounting the member from the robot;

remounting the member on the robot;

varying the posture of the robot having the member remounted thereon;

storing current data indicating forces sensed by the force sensor due to the variance in posture of the robot having the member remounted thereon; and updating a parameter used for conversion of signals detected by the force sensor in accordance with a difference between the reference data and the current data.

13. The method as in claim 12, wherein the posture of the robot is varied in the same manner during said varying the posture of the robot having the member mounted thereon and said varying the posture of the robot having the member remounted thereon.

14. A method of calibrating a force sensor mounted on a robot, comprising:

mounting a tool on the force sensor on the robot at a first time;

dismounting the tool from the robot;

remounting the tool on the robot at a second time; and updating a parameter used for conversion of signals detected by the force sensor in accordance with differences between first and second data corresponding, respectively, to measurements taken at the first and second times by the force sensor while a posture of the robot is varied.

15. The method as claimed in claim 14, wherein the first time mounting is performed as part of the manufacturing process of the robot.

* * * * *

UNITED STATES PATENT AND TRADEMARK OFFICE
CERTIFICATE OF CORRECTION

PATENT NO. : 6,382,012 B1
DATED : May 7, 2002
INVENTOR(S) : Ryuichi Hara et al.

It is certified that error appears in the above-identified patent and that said Letters Patent is hereby corrected as shown below:

Column 1,
Line 37, after "of" insert -- X, --.

Column 2,
Equation (5): after "(" second occurrence, insert -- $Fx^T$ --
Line 46, change "Ex" to -- Fx --.

Column 3,
Equation (8): insert -- F= -- to the left of the equation, centered in the middle of the equation.

Column 4,
Line 3, change "parrying" to -- carrying --.
Line 36, insert -- , -- after "tool", first occurrence.

Column 5,
Line 26, change "vb" to -- v'b --.
Line 27, change "v'ad" to -- v'a1 --.
Line 5, equation (15) change "V'0T" to -- $V'0^T$ --.

Column 6,
Line 44, change "Fig." to -- Fig. 1 --.
Line 65, change "Range" to -- flange --.

Column 8,
Line 31, change "re calibration" to -- re-calibration --.

Signed and Sealed this

Fourteenth Day of January, 2003

JAMES E. ROGAN
*Director of the United States Patent and Trademark Office*